Figure 1:
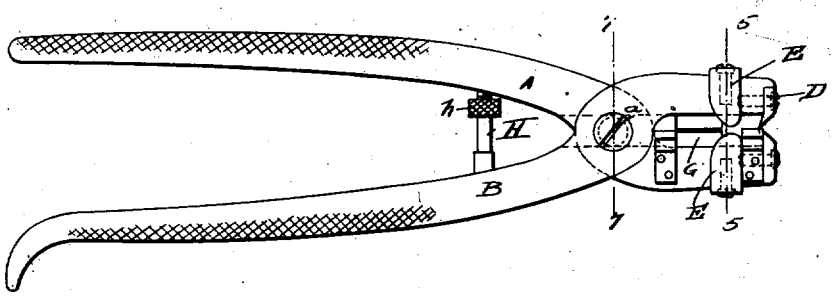

S. E. AARON.

COMBINATION SPLITTING AND STRIPPING PLIERS.

APPLICATION FILED MAY 12, 1916.

Reissued July 25, 1916. 14,169.

Inventor

Solomon E. Aaron;

By Mason Fenwick & Lawrence,

Attorneys

UNITED STATES PATENT OFFICE.

SOLOMON E. AARON, OF BOSTON, MASSACHUSETTS, ASSIGNOR TO S. E. AARON COMPANY, OF BOSTON, MASSACHUSETTS, A CORPORATION.

COMBINATION SPLITTING AND STRIPPING PLIERS.

14,169. Specification of Reissued Letters Patent. Reissued July 25, 1916.

Original No. 1,096,983, dated May 19, 1914, Serial No. 718,638. Application for reissue filed May 12, 1916. Serial No. 97,177.

*To all whom it may concern:*

Be it known that I, SOLOMON E. AARON, a citizen of the United States, residing in Boston, in the county of Suffolk and State of Massachusetts, (whose post-office address is 60 State street, Boston, Massachusetts,) have invented certain new and useful Improvements in Combination Splitting and Stripping Pliers, of which the following is a specification.

My invention relates to tools, and more especially to wire strippers; and the object of the same is to produce a pair of pliers such as are used by linemen and electricians who handle insulated wire of one or more strands and who have need for a tool or implement with which a two-strand wire can be split longitudinally through the outside insulation, a single wire can be "circled," crushed, and stripped of the inside insulation, and one or more strands can be severed or cut off.

Figure 2:
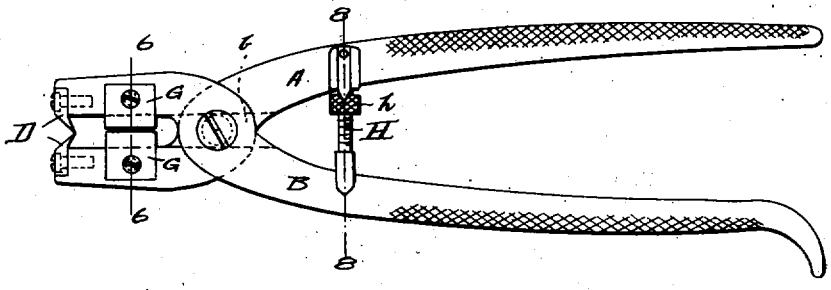
Figure 3:
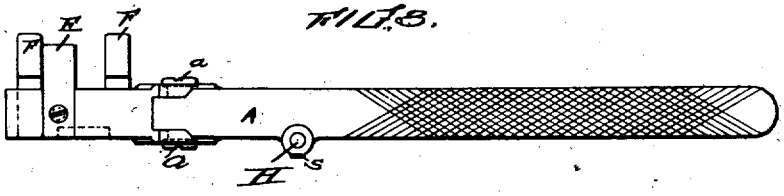
Figure 4:
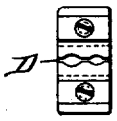

The pliers of my invention constitute a single tool having several pairs of coacting blades for selective use in performing any of these acts, either at the end of a stretch of wire or in its mid-length when the electrician desires to make a "tap in" as is well understood. In a tool or implement having these various possibilities there must be due consideration for the position of the end or the stretch of wire being treated, so that neither the insulation nor the strand will be injured by one pair of blades while it is being acted on by another. Accordingly I prefer to place the strippers at the ends of the jaws with their coacting edges meeting on a line transverse to the length of the tool, the splitters with their coacting edges along one side of the jaws or one side face of the tool and a little nearer the pivot so they will be out of a line projected through the meeting edges of the strippers, and the cutters on the opposite side of the jaws and yet nearer the pivot so that they will be out of line with the coacting edges of the splitters and in position where the pliers have the best leverage. As the wire needs to be guided while being split, I employ supporting guides or rests, two in number and arranged at opposite sides of the splitters; and these guides and the intervening splitters are all offset beyond one side face of the tool so that a tap in can be made in a stretch of wire which need not be bent because it extends straight alongside the pliers past the pivot. As a considerable length of insulation must sometimes be removed from the end of a single wire, I form an opening through the pivot of the pliers and in the longitudinal line of the tool, and by preference I dispose the notches in the strippers slightly to either side of a line projected through the axis of this opening and between the stripper blades, whereby larger or smaller wire can be stripped. As the tool is intended for use on wires whose strands vary in size, I employ an adjustable stop mechanism which prevents the edges of any blades from being forced tightly together so as to dull them unnecessarily, but which can be set to limit the approach of the jaws and therefore of the blades and hence adapt the latter for use on larger wire; and this stop I prefer to locate between the handles and on the opposite side of the tool from the guides and splitters, where it is out of line with any of the blades or with the opening through the pivot. Details of the preferred construction of my improved tool will be found in the following specification, reference being made to the drawings wherein:

Figure 1 is a right side elevation of this tool, Fig. 2 a left side elevation, and Fig. 3 a plan view of the upper edge. These directions are only relative, and are used for descriptive purposes. Fig. 4 is an end view of the jaws, and Figs. 5, 6, 7 and 8 are cross sections on the lines indicated by their respective numerals.

Figure 7:
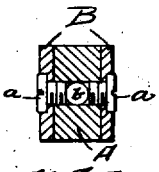

The pliers are made up of two members crossing each other and pivoted where they cross, so that there are handles A and B at one side of the pivot and jaws C at the other side as usual. Where they cross each other one member is divided into two arms embracing or passing astride the other member as best seen in Fig. 7, and through the last-named member is formed a longitudinal opening *b*. The pivot itself is formed by pins such as screws *a* passing through the arms of the outer member and into the inner member, but they do not interrupt the opening and therefore the latter is left for the reception of the end of a wire which has been passed through the strippers.

To the extremities of the jaws C are fixed the stripper blades D. Their shanks may well be held by screws as shown, and their bodies incline inward toward the pivot of the pliers. Their inner faces are beveled so as to adapt them to the stripping of insulation from wire in the manner of two chisels drawn along said wire. In order to easily and efficiently "circle" the wire and cut the insulation thereon down to the strand without injuring the latter, and to adapt them to different sizes of wire, two elliptical openings of different dimensions are formed by crescent shaped notches in their coacting edges, as shown at *d* in Fig. 4. While I prefer this form as being the most efficient, these notches may be circular, angular, or of other shape and still be operative. To still further adapt the pliers to different sizes of wire, additional pairs or sets of stripper blades may be provided along with the tool for substitution when desired or when those shown become dull or worn; or the stop mechanism described below may be used. These strippers may be located on the side of the jaws, but I prefer them where shown.

Figure 5:
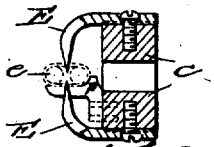

At one side of the tool (the right side as here shown) is located a pair of splitter blades E. These have their shanks secured to the outer edges of the jaws C by screws as shown in Fig. 5, and their bodies project beyond the side of the jaws and are given substantially right angular bends toward each other so that their cutting edges coact on a line offset beyond one side face of the tool and at some little distance from the sides of the jaws. These edges may touch when in use, although it is not absolutely necessary to have them come in actual contact in order to split the outer insulation from a two-strand wire. But to do the work successfully, I provide one jaw with a pair of supporting guides or rests F which are spaced from each other forward and back of the pair of splitters as seen in Fig. 1, and are shaped and placed so that they support the wire in exactly proper position as shown at *e* in Fig. 5 to guide it between the active edges of the blades E when the tool is closed.

Figure 6:
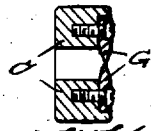

At one side of the tool (at the left side of the jaws as herein shown) is located a third pair of blades G for cutting or severing the wire, whether the latter be insulated or bare. These may well have their shanks inset into the side faces of the jaws and held therein by screws as seen in Fig. 6, and their cutting edges should meet each other when the pliers are closed. By preference I place these cutters quite near the pivot. The use of these cutters is the same as in the ordinary type of cutting pliers, and they make the combination device for linemen complete without the necessity for carrying another tool. Many tools have cutters in the shape of notches formed in the sides of the crossing members near their pivot, which notches register when the tool is opened and are thrown out of registry as the handles are forced together; but I find that in the work of linemen it is not so often convenient to use cutters in that position as in the position I have shown and described. Moreover, by making the cutter blades removable, they can be replaced when they become dull. It is not necessary that they be at that side of the tool opposite from the splitters, although I prefer the position shown. The order of parts reading from said pivot forward, as shown in Fig. 1, is as follows: one guide F, the cutters G, the splitters E, the other guide F, and the strippers D.

Figure 8:
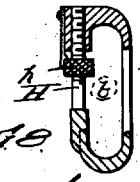

At one side of the tool (the left as herein shown) and preferably in rear of the main pivot is located a stop mechanism for preventing the crushing of the active edges of the various cutters on each other when the operator forces the handles together. This mechanism is shown as consisting of a screw H whose upper end is threaded into a boss formed as an offset on one handle as A and whose lower end rests upon a similar boss formed as an offset on the other handle B, and the screw has a knurled portion or knob providing a convenient finger-hold by the means of which it can be turned. To hold it in adjusted position a spring *s* may be fixed to the boss on the handle A and have at its lower end a small knife edge frictionally engaging notches in the knob *h*. This permits the latter to be rotated in either direction, but prevents it being moved by accident as when the tool is laid on this side upon a bench. The relative position of this adjustable stop to the opening *b* through the main pivot is indicated in Fig. 8, and therefore it is out of the way of the end of a wire which has been passed through the strippers and opening and for some distance between the handles A and B. The stop is preferably also on that side of the tool opposite from the splitters and their guides so that it is out of the way of a wire running along the right side of the tool. I do not wish to be limited to this exact form of stop mechanism, as it will readily be seen that a cam or some other type of adjustable stop might be substituted for the screw herein shown.

The use of this device is as follows: To sever or cut a wire, whether or not it is insulated, the jaws are opened and passed transversely across the wire until the latter lies between the cutters G, and when the handles are pressed together the coacting edges of these cutters perform the work at a time when the stop has not been adjusted to adapt the tool for a larger size of wire than usual, or in other words when the stop permits said edges to come practically into contact with each other. To split a two-strand wire, the tool is opened and the wire laid on the guides F as seen at *e* in Fig. 5; then the tool is closed so that the splitters E cut through the outer insulation and nearly meet each other, and the entire tool is drawn along the wire which now lies along the right side of the implement. By this means the wire can be split either at its end, or within its length as when a tap in is desired. To strip a wire, the tool is opened and the insulated wire passed between the strippers and jaws, and through the opening *b* if a long portion of the strand is to be stripped; then the tool is closed and the wire deflected to one side or the other slightly so as to stand opposite the elliptical opening *d* of the proper size as seen in Fig. 4, and the wire held while the tool is drawn quickly off its end. The openings shown may both be enlarged a little if the strand of wire be larger, by adjusting the stop mechanism H. To "circle" a wire as is usually done before it is stripped, and so that only the insulation is cut, the insulated wire is laid between the strippers as just described and held, while the tool is rotated axially to and fro. To "crush" the insulation on a wire as is sometimes done before stripping, the jaws are opened and the tool placed at right angles to the wire until the latter lies between the strippers, the stop H adjusted, and the handles brought together so that the active edges of the strippers now cut through the insulation and crush it—tearing it away from the strand without actually coming into contact with the latter and therefore without injuring it at all. Hence a very tough piece of material can be treated with the strippers, as it can be circled at each end of the part to be stripped and it can be crushed throughout the length of said part, and subsequently stripped. During all of these uses of the various parts of this improved tool, no one part interferes with another or stands in the path of the wire, and therefore the latter need not be bent. While the forward guide F is shown in Fig. 1 as standing opposite a line through the strippers, it should be remembered that the wire stands on this line only when it is being crushed and not when it is being stripped.

What I claim is:

1. In an implement of the class described, crossed and pivoted handles having jaws, two supporting guides secured to one side of one jaw, and a pair of coacting blades secured respectively to the opposite jaws intermediate of the supporting guides.

2. In an implement of the class described, pivoted jaws, spaced supporting guides secured to one side of the jaws, and cutters secured to the opposite sides of the jaws intermediate of the supporting guides.

3. In an implement of the class described, pivoted jaws, supporting guides secured to one side of one of the jaws in spaced relation, a splitting blade secured to the same jaw and disposed between the guides, and a second splitting blade secured to the other jaw in alinement with the first.

4. In a tool of the class described, two members crossing and pivoted to each other and continued into jaws, supporting guides spaced from each other and projecting to one side of one jaw, a pair of blades carried respectively by the jaws and offset to one side of the same and adapted to coact with each other at a point between said guides when the jaws are moved toward each other, and means out of alinement with said guides and edges for limiting such movement.

5. In a tool of the class described, two members crossing and pivoted to each other and continued into jaws, and a pair of splitter blades whose shanks are respectively secured to the outer edges of said jaws and whose bodies are bent toward each other alongside of and offset from one side of such jaws with their active edges in alinement and adapted to coact when the jaws are moved toward each other, and means carried by and offset from the other side of said members, out of alinement with said active edges for limiting said movement.

6. In a tool of the class described, the combination with two members crossing and pivoted to each other where they cross, forming handles at one side of the pivot and jaws at the other; of three independent pairs of blades carried by said jaws with the active edges of the blades of each pair respectively in alinement with each other and coacting on a line out of alinement with the other blades, and an adjustable stop carried by the handles beyond said pivot and out of alinement with all said cutting edges for limiting the movement of the jaws toward each other.

7. In a tool of the class described, two jaws, means for moving them toward each other, and adjustable stop mechanism for limiting such movement; combined with a pair of cutter blades, a pair of stripper blades, and a pair of splitter blades, all carried by said jaws and the splitters having their edges coacting at a point between the other pairs and offset beyond one side face of the jaws.

8. In a tool of the class described, the combination with two members pivoted to each other and continued into jaws; of a pair of stripper blades across the extremities of the jaws, a pair of longitudinal cutter blades near the pivot and secured to one side face of the jaws, and a pair of splitter blades between the other pairs with their edges coacting on a longitudinal line offset beyond the opposite side face of the jaws.

9. In a tool of the class described, the combination with two members crossing and pivoted to each other and continued into jaws; of a pair of stripper blades secured to the ends of the jaws and inclined toward the pivot with their edges coacting on a line transverse to the tool, and a pair of splitter blades between the strippers and pivot with their edges coacting on a line longitudinal of the tool and offset beyond one side face of the jaws.

10. A tool of the class described comprising members crossing each other and continued into jaws, a pivotal connection between the members at their point of crossing, the tool having a longitudinal opening through such point, a pair of stripper blades respectively carried by the jaws and having registering notches in their active edges, and additional coacting blades carried by said jaws with their active edges out of alinement with said opening.

11. A tool of the class described comprising members crossing each other and continued into jaws, a pivotal connection between the members at their point of crossing, the tool having a longitudinal opening through such point, and a pair of stripper blades whereof each is fixed to one jaw and has a notch and the notches register to form an opening to partly encircle the wire from which the insulation is to be removed.

12. A tool of the class described comprising a pair of members crossing each other and continued into jaws, a pivot connecting said members at the point of crossing, the tool having a longitudinal opening through such point, and stripper blades carried by said jaws and having their active edges provided with registering notches spaced on opposite sides of a line projected through the axis of said opening.

13. In an implement of the class described, two members crossing each other and continued into jaws, one member being divided at the point of crossing into arms embracing the other and the last-named having an opening through its crossing point extending longitudinally of the pliers, pivot pins through said arms of one member and engaging the other, and stripper blades carried by the jaws with their active edges adapted to meet on a line projected through the axis of said opening, said edges having registering notches at opposite sides of said line.

14. In an implement of the class described, cross members constituting handles and jaws, one member being divided at the point of crossing and embracing the other and the latter being provided with an opening extending in parallelism with the length of the implement; and an adjusting stop carried by the handles out of alinement with the said opening.

15. A pair of pliers of the class described comprising members crossing each other and continued into jaws, a pivot connecting said members at the point of crossing, the pliers having a longitudinal opening through such point, blades carried by said jaws, and adjustable stop mechanism carried by said members out of the path of a line projected through the axis of said opening.

16. A pair of pliers comprising two members crossing each other and continued into jaws, one member being divided at the point of crossing into arms embracing the other and the last named having an opening through its crossing point extending longitudinally of the pliers, pivot pins through said arms of one member and engaging the other, stripper blades secured to the ends of said jaws with their edges adapted to meet on a line projected through the axis of said opening, and adjustable stop mechanism carried by said members out of the path of said line.

SOLOMON E. AARON.